United States Patent
Diepstraten et al.

(10) Patent No.: US 7,421,273 B2
(45) Date of Patent: Sep. 2, 2008

(54) MANAGING PRIORITY QUEUES AND ESCALATION IN WIRELESS COMMUNICATION SYSTEMS

(75) Inventors: Wilhelmus Diepstraten, Haghorst (NL); Jayant Somani, Reading, PA (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/443,072

(22) Filed: May 22, 2003

(65) Prior Publication Data
US 2004/0092278 A1 May 13, 2004

Related U.S. Application Data

(60) Provisional application No. 60/425,895, filed on Nov. 13, 2002.

(51) Int. Cl.
*H04Q 7/20* (2006.01)
(52) U.S. Cl. .................. 455/445; 455/41.2; 455/69; 455/11.1; 455/66.1; 370/348
(58) Field of Classification Search .............. 455/41.2, 455/69, 66, 445, 11.1; 370/338
See application file for complete search history.

(56) References Cited

U.S. PATENT DOCUMENTS

| | | | | |
|---|---|---|---|---|
| 6,898,649 | B2* | 5/2005 | Goudie | 710/112 |
| 2001/0053149 | A1* | 12/2001 | Mo et al. | 370/389 |
| 2002/0159418 | A1* | 10/2002 | Rudnick et al. | 370/338 |
| 2003/0223453 | A1* | 12/2003 | Stoler et al. | 370/444 |
| 2004/0047319 | A1* | 3/2004 | Elg | 370/338 |

* cited by examiner

*Primary Examiner*—Nay Maung
*Assistant Examiner*—Richard Chan

(57) ABSTRACT

A method and system for servicing data traffic in wireless local area networks (such as IEEE 802.11 networks) in multiple queues having different levels of priority. These queues include at least a low priority queue for 'best effort' traffic, a medium priority queue for streaming data such as video pictures, and a high priority queue for voice traffic, and are serviced in order of decreasing priority. To prevent the 'best effort' traffic in the low priority queue from being 'starved', a bit is set to indicate when such a condition is likely to occur, and the low priority queue is served first when that bit has been set. Alternatively, low and medium priority traffic is handled on a weighted round-robin basis, and high priority traffic is given strict priority over both. Transmit and receive queues are handled on a rotating priority basis.

20 Claims, 4 Drawing Sheets

MANAGING PRIORITY QUEUES AND ESCALATION IN WIRELESS COMMUNICATION SYSTEMS

This application claims priority from U.S. Appl. No. 60/425,895, filed Nov. 13, 2002, entitled "Techniques For Managing Priority Queues and Escalation Considerations in Wireless Communication Systems", the entirety of which is expressly incorporated herein by reference.

BACKGROUND OF THE INVENTION

1. Field of the Invention

The invention relates to Quality of Service (QoS) mechanisms in wireless Local Area Networking (LAN) communication systems. More particularly, it relates to management of multiple priority queues in wireless communications systems so as to ensure that lower priority traffic is not precluded from accessing the medium during sustained periods of higher priority traffic being sent.

2. Background of Related Art

In communications systems according to the background art, 'transmit' packets flow from host memory to an internal transmit (packet) buffer usually under the control of a resident data movement or DMA engine, which in turn is commanded by the system driver or software. The Media Access Controller (MAC) retrieves transmit data from this packet buffer, frames it appropriately, and forwards it to a physical network layer device. Likewise, 'receive' packets flow to the MAC from the receiver. The MAC extracts packet data from the surrounding header and CRC, while packet management logic determines whether each packet should be discarded, buffered, or merely decoded for network flow control and power management. Each packet which reaches the receive buffer is forwarded to the host computer via a data movement engine, again operating under host driver control. Generally, the functional implementation of on-device buffers limits the amount of physical data that can be brought onto the device—i.e. packet memory is generally limited due to cost and area concerns.

In these communications systems according to the background art, packets are sequentially queued and managed on a "best-effort" basis.

FIG. 4 is a block diagram showing a conventional non-priority based management provisions.

In particular, as shown in FIG. 4, a MAC (Medium Access Control layer) 110 is interposed between a system 120 and a medium 130. The MAC 110 includes a Transmit Packet Buffer 150 and an associated Channel Access routine 160, as well as a Receive Packet Buffer 180 and an associated Channel Access routine 190.

In systems that offer only a single queue structure, a boundary condition is effectively placed on the system software or driver requiring that in the transmit direction the software apply a minimum packet queuing strategy in the available (system/host) transmit buffers in systems that want to establish multiple-class priority traffic scenarios. (The transmit direction is defined as the direction of packets which traverse from local system memory through the system out onto the medium. The receive direction is defined as the direction of incoming packets from the medium that are demodulated and placed into system memory.) This requirement or boundary condition is typically placed on a system in an effort to prevent a potentially large delay situation when a high priority packet is passed down to the driver from the operating system. Such a priority frame cannot be "inserted" easily in the existing queue, mostly because the potential ownership or consumption of available buffer space is unknown (e.g., it may have already been relinquished to the device).

SUMMARY OF THE INVENTION

In accordance with the present invention, a transmit direction is designated as a priority direction if a most recent data transfer was in a receive direction. The receive direction is designated as the priority direction if the most recent data transfer was in the transmit direction. Data is transferred in the priority direction if data is queued to be transferred in the priority direction.

In accordance with another aspect of the present invention, a method and apparatus for queuing data comprises providing a plurality of data queues in a transmit direction. Each of the data queues has one of a predetermined plurality of different level priorities. A data starvation condition is checked for in one of the plurality of data queues having a lowest priority. The lowest priority data queue is serviced if the data starvation condition is detected.

In accordance with yet another aspect of the present invention, a method of queuing data comprises providing a plurality of data queues in a transmit direction, each of the plurality of data queues having one of a predetermined plurality of different level priorities. A predetermined weighted round robin scheduling of servicing each of the plurality of data queues is established. The scheduling includes an unequal number of services to at least two of the plurality of data queues in each service round.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
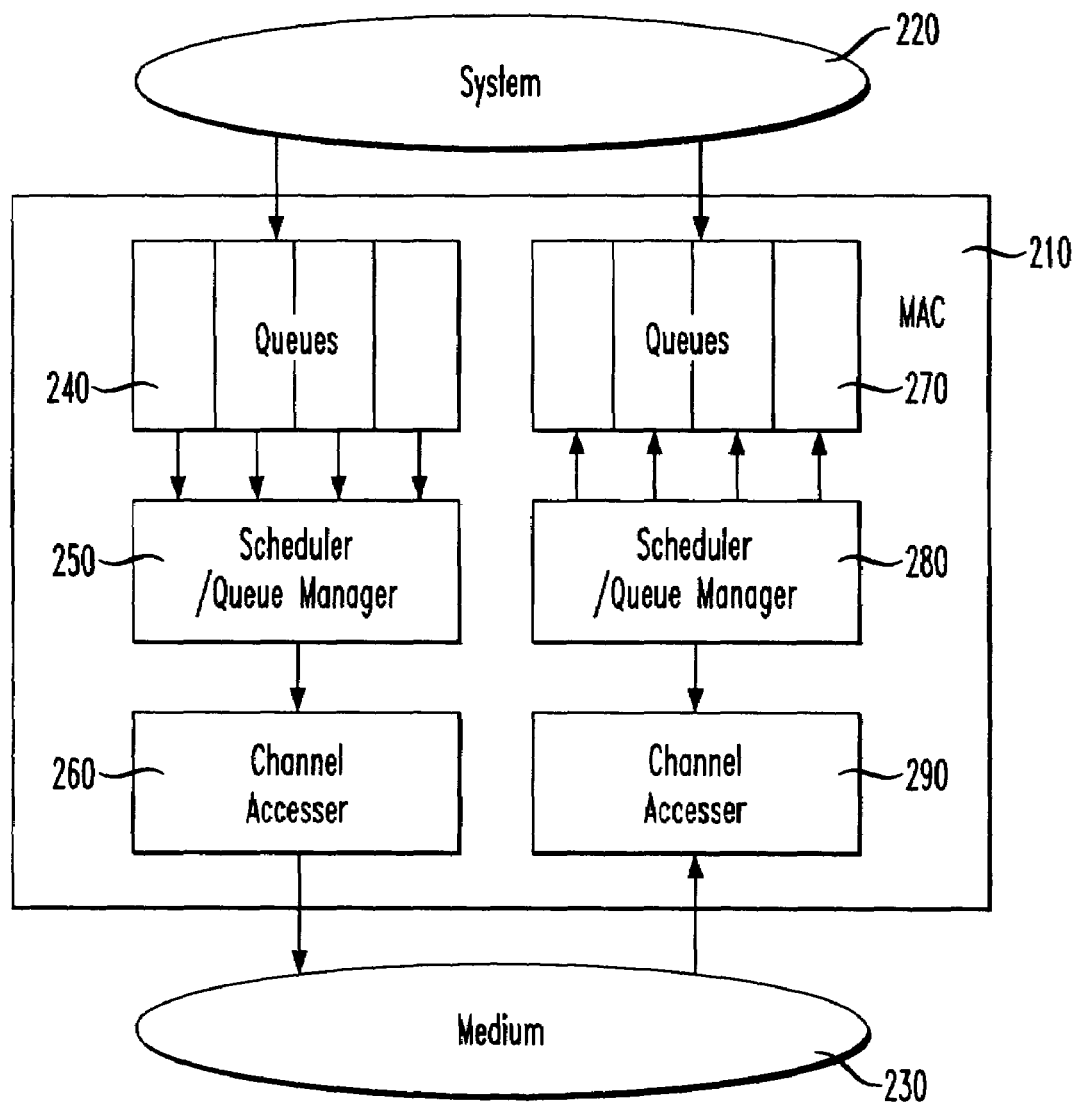
FIG. 1 is a block diagram showing hardware-based priority management provisions according to a preferred embodiment of the present invention.

In accordance with the principles of the present invention, multiple data queues are added into a communications system that when used with simple control mechanisms allow multiple classes of communications traffic, and different latency and delivery objectives to be treated differently.

To enrich the consumer experience, it is valuable to consider mechanisms that can be employed to support Quality of Service initiatives in wireless Local Area Networking communication systems. Quality of Service (QoS) is an all-encompassing phrase that denotes that different types of communications traffic are treated differently.

In a telecommunications system, QoS is typically tied to voice and video services where users, who are accustomed to using the telephone, expect high quality voice because historically, voice was considered to be high priority. In a data communications system, QoS is typically tied to multimedia services, or more generally speaking to data systems that handle all types of data streams ("streaming services") that require no "automatic" priority or re-transmission if a data packet is somehow lost in real-time.

Telecom systems are inherently stream oriented whereas data streams are inherently "bursty" in nature. In the circuit switched world of telecom systems, "control" is the model solution for all problems.

While a "control" solution may be fine for constant rate applications like voice and video where prediction of future needs is easy, a "control" solution looses some efficiency when handling data communications. On the other hand, data systems are complex and contain mixes of data sources and sinks (i.e., software applications). Breaking data streams into packets makes it possible to serve many sources efficiently by multiplexing many data streams. However, delays are caused in the system, making the price high. Some applications must bound or at the very least minimize this delay component, whereas other applications may be more immune to delivery latencies (herein referred to as "best-effort" delivery).

Wireless systems add a second level of uncertainty (and hence potential delay) in that traffic flows are unpredictable. This unpredictability is in no small part due to the unpredictability of the wireless radio links, as well as external interference sources.

Accordingly, rigid management controls of traffic classes in wireless LANs is not advised. Rather, basic goals of a managed WLAN system preferably include retaining a basic "collision avoidance" approach together with adaptive flow control to keep priority traffic flowing.

In disclosed embodiments, this results in a progressive reduction of service rates for lower classes of service as the load of the medium increases. Moreover, such a system preferably also includes load feedback of the medium used to drive local service rate decisions, e.g., per service class, and the use of drop rate feedback to tell the relevant application whether or not a new "connection" is possible.

A key requirement in QoS-managed systems is that all devices preferably implement a given model and policy.

In a non-priority managed system, a single queuing structure is generally used to buffer up packets at the system level. Using this strategy when priority traffic is available, however, effectively places a boundary condition on the device driver requiring that in either the transmit (Tx) or receive (Rx) directions, the relevant routines apply a minimum packet queuing strategy to the available buffer. This requirement is placed on the system in an effort to prevent a potentially large delay situation when a high priority packet is passed down to the driver. An underlying assumption is that such a priority frame cannot be "inserted" easily into an existing queue because it is unknown whether or not the ownership of the available buffer has been relinquished to the device.

To remediate this possibility, a separate or multiple separate high priority queues allow more low priority packets to be queued independently of a high priority traffic queue. When high priority traffic is then available, a mechanism exists within the system to allow an on-chip data movement engine to retrieve data from the priority queues/buffers if it exists prior to servicing best-effort (i.e., lower priority) queues.

In emerging systems, multiple classes of traffic having different latency and delivery objectives are being considered. Quality of Service (QoS) is an all-encompassing phrase that denotes that different types of communications traffic are treated differently. Given the latency and delivery objectives of certain traffic classes, certain packets can no longer be treated on a "best-effort" basis and additional considerations such as queue management need to be considered.

IEEE802.11(e) is currently considering four classes or tiers of priority defined as (in order of lowest to highest priority):
  Best effort
  Excellent effort
  Video (& Audio)
  Voice For the purposes of this analysis we consider a three class system that offers provisions for low priority "best effort" traffic (i.e., non time-sensitive traffic), medium or intermediate priority class traffic (traffic having some latency demands), and very high priority (e.g., voice applications). In this three class system, we have for convenience grouped the excellent effort and video traffic classes of the four class system together. While these techniques can be addressed by either software or on-chip hardware methods, significant throughput and efficiency advantages can be realized by providing realtime hardware-based queuing and escalation mechanisms. Accordingly, henceforth only hardware-based techniques will be discussed in detail, although it will be appreciated by those skilled in the art that the scope of the invention is not limited thereto.

Several levels of "priority" are considered. At one level the ability to manage both transmit and receive packets is considered. A second level of management occurs within a particular direction or service, and can be applicable in either a transmit or receive direction. In this context, an additional register or registers is/are added to the design to allow higher priority transmit packets to be queued up and sent through the network independent from "best-effort" transmit packets. This requirement allows increased system flexibility from a driver perspective as it removes established boundaries on minimizing the number of queued transmit packets residing in a given buffer structure. In a receive direction it is assumed that packets will be moved off of the device into system memory quickly such that priority class management of incoming (receive) packets is not required. However, similar techniques as described to manage the transmit direction can also be leveraged at the receive level as well.

FIG. 1 shows a block diagram showing hardware-based priority management provisions according to a preferred embodiment of the present invention.

In particular, as shown in FIG. 1, a MAC 210 is interposed between a system 220 and a medium 230. The Mac 210 includes in a transmit path a plurality of different priority queues 240, a Scheduler/Queue manager 250, and a Channel Accesser 260, and includes in a receive path a plurality of different priority queues 270, a Scheduler/Queue manager 280, and a Channel Accesser 290.

In a preferred embodiment of the invention, the data queues 240, 270 are serviced in order of increasing priority, starting with high priority traffic such as voice traffic (highest priority), then video traffic and the like, and then 'best effort' traffic (lowest priority). However, importantly, if a low priority queue holding, e.g., 'best effort' traffic is 'starved', i.e., if insufficient or essentially no low priority 'best effort' traffic has been transferred recently, then a special flag or bit is set, indicating that a low priority queue is to be accessed first.

In another preferred embodiment of the invention, voice traffic is given strict priority and other data queues are serviced on a weighted round-robin basis, i.e. each is serviced in turn, with a queue or queues having higher priority being serviced more frequently.

In yet another embodiment, competition between transmit and receive queues may be preferably resolved by rotating priority between the two directions of data transfer. In particular, when management of both transmit and receive packets needs to be considered, a simple rotating priority scheme between the Transmit (Tx) and Receiver (Rx) states may be preferable. This is considered in a manner such that one state would not have absolute priority over the other state, which could cause a starvation condition to occur on a per "service" basis ("service" defined as either Tx or Rx). In this scheme, given a limited on-chip receive packet buffer, general priority is given to quickly bursting packets from on-chip storage registers into system memory for processing as quickly and efficiently as possible.

Figure 2:
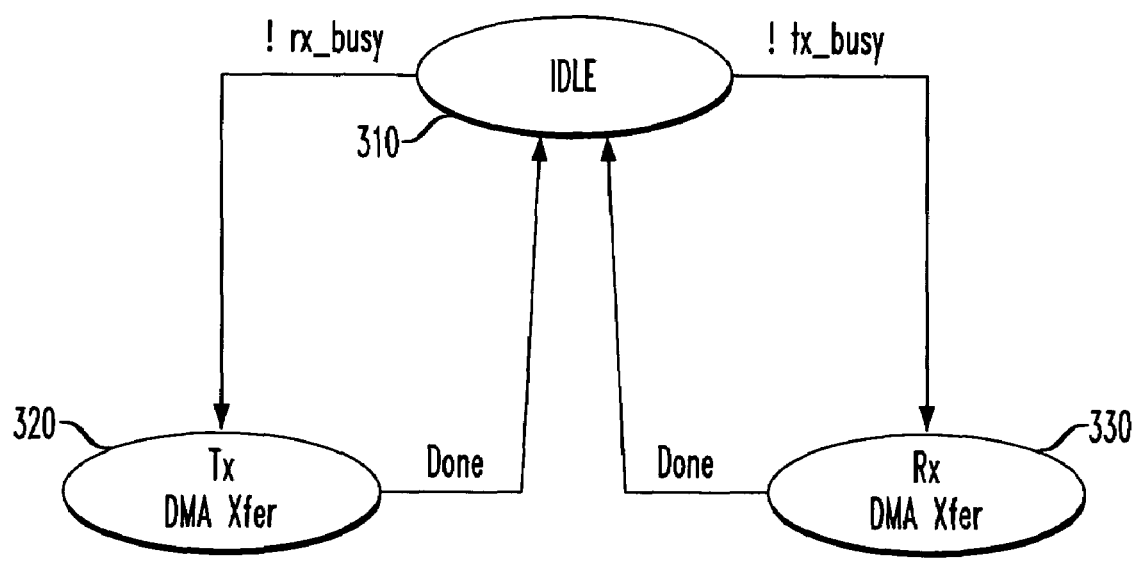
FIG. 2 is a flow chart showing exemplary overall priority management between transmit and receive directions according to a preferred embodiment of the invention.

FIG. 2 is a flow chart showing exemplary overall priority management between transmit and receive directions, in accordance with the principles of the present invention.

In particular, as shown in FIG. 2, when the controller leaves either the transmit state 320 or receive state 330 and reaches an IDLE state 310, the state machine will look to see if another pending transfer is required. If so, it will arbitrate between transmit and receive sections on a rotating priority basis.

It should be noted that this constraint applies for both the transmit and receive directions. Furthermore, this constraint effectively results in a desired automatic rotating priority scheme without the need to explicitly handle the case that both events are active.

Upon accounting for a rotating priority scheme with either the receive or transmit direction, the ability to accommodate priority traffic on a per service basis (used in this context to mean either a transmit service or a receive service) needs to then be considered. Considering the transmit service side, the ability to accommodate priority traffic in the transmit direction can simply be added into a system by supporting additional dedicated priority buffers (i.e., better than "best effort"). This requirement removes the aforementioned queuing issue encountered with a single buffer or queue and allows more low priority packet queuing to occur (in its own separate and distinct buffer), while not affecting high priority traffic.

Preferably, the priority rules remain intact and require a state machine to provide a fixed priority between multiple queues (e.g., 3 queues in the predefined example) as transmit buffers while maintaining a rotating priority scheme between the Tx and Rx states. Preferably, transmit priority queues get absolute priority over lower priority queues such as the best-effort queue, or the normal and best-effort queues should be active concurrently.

Figure 3:
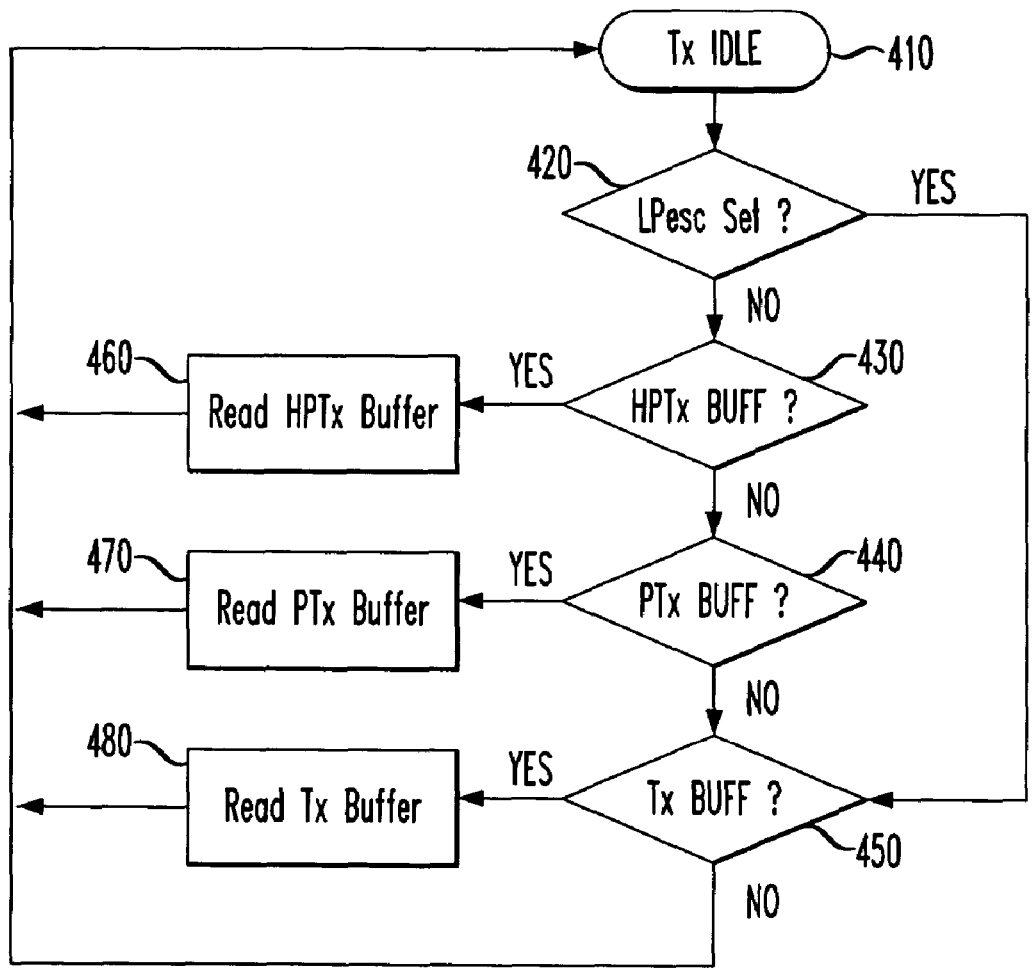
FIG. 3 is a flow chart showing exemplary transmit queue priority management according to a preferred embodiment of the invention.
Figure 4:
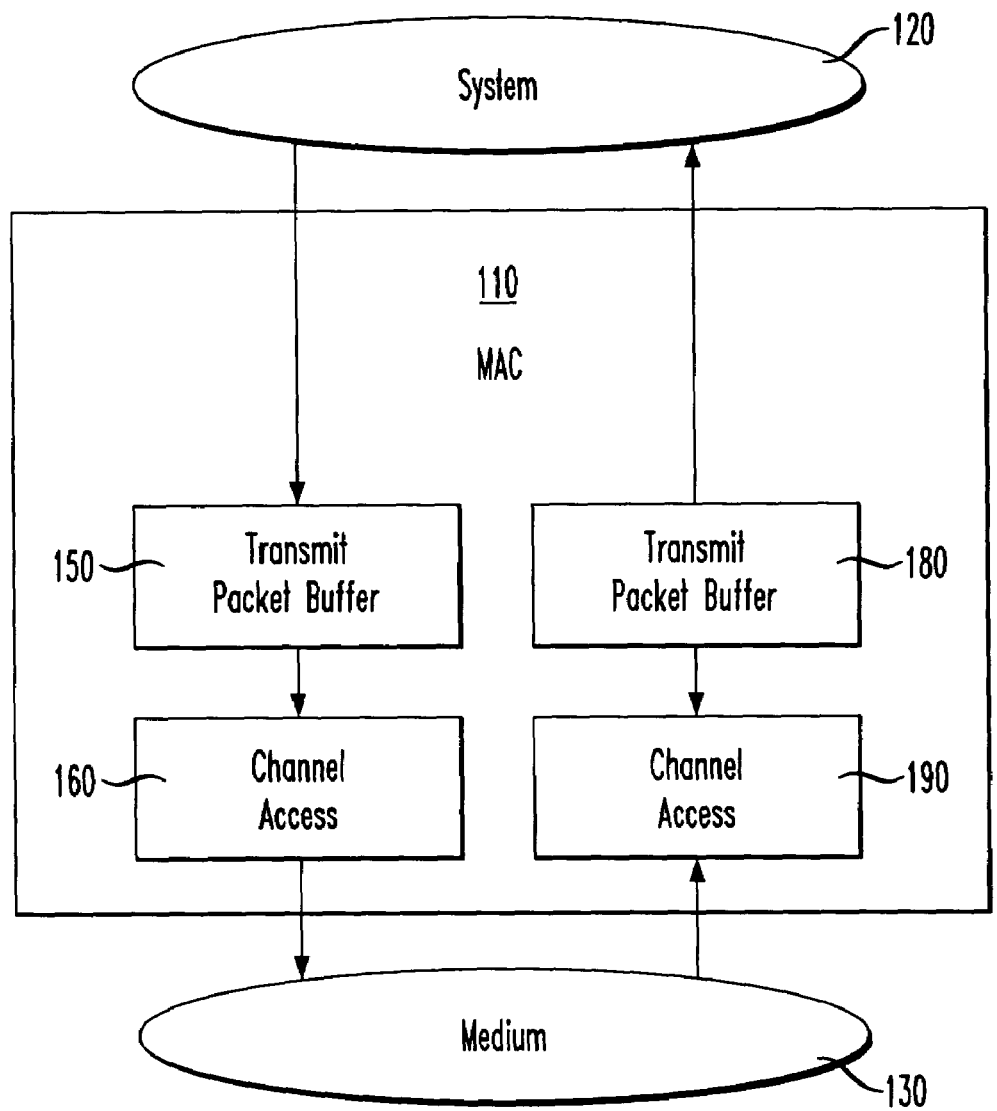
FIG. 4 is a block diagram showing a conventional non-priority based management provisions.

FIG. 3 is a flow chart showing exemplary transmit queue priority management according to a preferred embodiment of the invention in a three-class system.

Note that in FIG. 3, without certain policy management in place and further assuming constantly filled buffers for all traffic classes, the potential for low priority data starvation becomes an issue caused by strict priority handling of higher priority queues (e.g., video, best effort, and excellent effort buffers).

Handling video and best/excellent effort buffers with some kind of "weighted round robin" scheduling is one method that can be employed to ensure that data starvation does not occur. This is implemented fairly simply by servicing the queues in a given sequence, e.g., video, video, normal, video, video, normal, etc. Because of the nature of voice traffic, it can still be serviced with strict priority.

In yet another embodiment of the invention, provisions are added to ensure that "best-effort" priority level traffic is not "starved out" by the engine servicing higher priority queues that are not as rigid as the aforementioned "weighted round robin" scheme. Starvation of the best effort traffic in the lowest priority queue can be detected by any suitable means known in the art, such as by measuring the data rate by identifying whether the number of data message messages buffered for transmission exceeds a specified threshold, or by any other means.

These provisions are preferably controlled by device firmware or by a software-based scheduling mechanism using a predefined flag or bit (e.g., called Low Priority Escalation or "Lpesc") in a local device register. The Lpesc bit is used to indicate to the device data movement engine that the Low Priority data buffer is being starved and should be serviced next or first, even if a pending high(er) priority data packet is waiting in its respective data queue/buffer.

Referring now to FIG. 3, in step 420 it is determined whether the LPesc bit is set, and if the LPesc bit is set, then the method jumps to step 450. If the LPesc bit is not set, then the method proceeds to step 430, in which the High Priority transmit buffer is checked. If High Priority data is found to be present in the High Priority transmit buffer in step 430, then the High Priority data is read from the High Priority transmit buffer in step 460, and in step 410 the system returns to an idle transmit state. If no High Priority data is found to be present in the High Priority transmit buffer in step 430, then the method proceeds to check if Medium Priority data is present in the Medium Priority transmit buffer in step 440, and if Medium Priority data is present it is read in step 470 and the system returns to the idle transmit state in step 410. If no Medium Priority data is detected in the Medium Priority transmit buffer in step 440, then the method proceeds to check the Low Priority transmit buffer in step 450, and if Low Priority data is present in the Low Priority transmit buffer it is read in step 480 and the system returned to the idle transmit state in step 410.

In accordance with another embodiment of the invention, at step 420 it is determined whether the LPesc bit is set. If the LPesc bit is set, then the method would service the low priority transmit buffer by switching to a weighted round robin scheduling technique. If the LPesc bit is not set, then the method would proceed to step 430, as illustrated in FIG. 3. With further reference to step 420, if the LPesc bit is set, a weighted round robin scheduling technique is used to ensure that the lowest priority queue will not be data starved. The lowest priority queue will be given an opportunity to transmit in accordance with the scheduling technique used. The lowest priority queue may not be given the opportunity to transmit at the next available transmit opportunity, but it will eventually obtain a transmit opportunity as provided for in the scheduling technique.

An interesting property of this invention is that it does not necessarily require changes in the 802.11 MAC and therefore it can be retrofitted onto an existing system. Clearly, if multiple queues are made available on the MAC device itself and the ability to obey the above priority and management rules considered, the ability to support different types of communications traffic in an efficient manner can be realized.

This invention provides a method to resolve Quality of Service issues in emerging communications systems by offering support for multiple queue management within the system. Also, an escalation mechanism is provided for the purposes of mitigating low priority class data starvation in communications systems, when it becomes an issue.

These multiple queue management mechanisms and escalation techniques can be leveraged by existing WLAN systems. While queue management techniques can be implemented in either hardware or software, multiple queues and queue management, as well as escalation techniques, can be used within a given piece of hardware to increase overall efficiency of the system.

The solutions described herein can be implemented in a fairly straightforward manner into existing WLAN systems by offering support for multiple queue management within the system with the ability to escalate a lower-priority entity during sustained periods of higher priority traffic. This advantage is important because the ability to provide a simple real-time method to support multiple traffic classes becomes extremely valuable, especially in emerging applications where Quality of Service (QoS) objectives will be highly desired. Further, having escalation mechanisms for the purposes of mitigating low priority class data starvation in these communications systems will further add value to these systems.

The invention also builds on the proven success of the current IEEE802.11 MAC and concepts, and can be retrofitted into existing designs. Furthermore, the invention adds QoS features that are adaptive and robust and fit well with existing traffic models. Efficient channel filling of the basic Wireless MAC is maintained by "filling" empty service levels. QoS with multiple traffic classes in accordance with anticipated requirements of future versions of the IEEE 802.11(e) specification, and can be implemented in accordance with the preferred embodiments of the invention.

While the invention has been described with reference to the exemplary embodiments thereof, those skilled in the art will be able to make various modifications to the described embodiments of the invention without departing from the true spirit and scope of the invention.

What is claimed is:

1. A method of queuing data, comprising:
designating one of a plurality of prioritized transmit direction queues as a priority direction queue if a most recent data transfer was in a receive direction;
designating a receive direction queue as said priority direction queue if said most recent data transfer was in a transmit direction;
transferring data in said priority direction queue if data is queued to be transferred in said priority direction queue;
providing a plurality of data queues in a transmit direction, each of said plurality of data queues having one of a predetermined plurality of different level priorities;
checking for a data starvation condition of one of said plurality of data queues having a lowest priority, said data starvation condition is determined by identifying whether a number of data messages buffered for transmission exceeds a predetermined threshold; and
servicing said one of said plurality of data queues having said lowest priority if said data starvation condition is detected.

2. The method of queuing data according to claim 1, wherein:
said plurality of data queues are implemented in a device transmitting over a wireless local area network.

3. The method of queuing data according to claim 1, wherein said predetermined plurality of different level priorities comprise:
said lowest priority, for best effort data;
an intermediate priority, higher than said lowest priority; and
a highest priority, for voice data.

4. Apparatus for queuing data, comprising:
means for designating one of a plurality of prioritized transmit direction queues as a priority direction queue if a most recent data transfer of a plurality of packets of data was in a receive direction;
means for designating a receive direction queue as said priority direction if said most recent data transfer of a plurality of packets of data was in a transmit direction;
means for transferring a plurality of packets of data in said priority direction queue if data is queued to be transferred in said priority direction queue;
means for designating one of a plurality of prioritized transmit direction queues as a priority direction queue if a most recent data transfer was in a receive direction;
means for designating a receive direction queue as said priority direction if said most recent data transfer was in a transmit direction;
means for transferring data in said priority direction queue if data is queued to be transferred in said priority direction queue;
means for providing a plurality of data queues in a transmit direction, each of said plurality of data queues having one of a predetermined plurality of different level priorities;
means for checking for a data starvation condition of one of said plurality of data queues having a lowest priority, said data starvation condition is determined by identifying whether a number of data messages buffered for transmission exceeds a predetermined threshold; and
means for servicing said one of said plurality of data queues having said lowest priority if said data starvation condition is detected.

5. The apparatus for queuing data according to claim 4, wherein:
said plurality of data queues are implemented in a device transmitting over a wireless local area network.

6. The apparatus for queuing data according to claim 4, wherein said predetermined plurality of different level priorities comprise:
said lowest priority, for best effort data;
an intermediate priority, higher than said lowest priority; and
a highest priority, for voice data.

7. A method of queuing data, comprising:
providing a plurality of data queues in a transmit direction, each of said plurality of data queues having one of a predetermined plurality of different level priorities;
servicing said plurality of queues in said transmit direction based on an availability of data within said plurality of queues for transmission;
checking for a data starvation condition of one of said plurality of data queues having a lowest priority; and
if said data starvation condition exists, switching to a weighted round robin scheduling technique to service said one of said plurality of data queues having said lowest priority.

8. The method of queuing data according to claim 7, wherein said predetermined plurality of different level priorities comprise:
said lowest priority, for best effort data;
an intermediate priority, higher than said lowest priority; and
a highest priority, for voice data.

9. The method of queuing data according to claim 7, wherein:
said checking includes identifying whether a number of data messages buffered for transmission exceeds a given threshold.

10. The method of queuing data according to claim 7, wherein said servicing comprises:
transmitting data from said lowest priority data queue at a next transmit opportunity.

11. The method of queuing data according to claim 7, wherein said servicing comprises:
scheduling transmission from said lowest priority queue according to a weighted round robin scheduling of said plurality of data queues.

12. Apparatus for queuing data, comprising:
means for providing a plurality of data queues in a transmit direction, each of said plurality of data queues having one of a predetermined plurality of different level priorities;
means for servicing said plurality of queues in said transmit direction based on an availability of data within said plurality of queues for transmission;
means for checking for a data starvation condition of one of said plurality of data queues having a lowest priority; and
means for switching to a weighted round robin scheduling means to service said one of said plurality of data queues having said lowest priority if said data starvation condition is detected.

13. The apparatus for queuing data according to claim 12, wherein said predetermined plurality of different level priorities comprise:
said lowest priority, for best effort data;
an intermediate priority, higher than said lowest priority; and
a highest priority, for voice data.

14. The method of queuing data according to claim 12, wherein:
said checking includes identifying whether a number of data messages buffered for transmission exceeds a given threshold.

15. A method of queuing data, comprising:
providing a plurality of data queues in a transmit direction, each of said plurality of data queues having one of a predetermined plurality of different level priorities;
establishing a predetermined weighted round robin scheduling of servicing each of said plurality of data queues, said scheduling including an unequal number of services to at least two of said plurality of data queues in each service round;
checking for a data starvation condition of one of said plurality of data queues having a lowest priority, said data starvation condition is determined by identifying whether a number of data messages buffered for transmission exceeds a predetermined threshold; and
switching to said weighted round robin scheduling technique if said data starvation condition exists.

16. The method of queuing data according to claim 15, wherein:
a first one of said plurality of data queues includes video data;
a second one of said plurality of data queues includes voice data; and
given that both said first data queue and said second data queue include data waiting for transmission, said first data queue including video data is serviced in a predetermined fashion more often than said second data queue including voice data.

17. The method of queuing data according to claim 15, wherein:
a first one of said plurality of data queues includes video data;
a second one of said plurality of data queues includes voice data; and
given that both said first data queue and said second data queue include data waiting for transmission, said second data queue including voice data is serviced in a predetermined fashion more often than said first data queue including video data.

18. Apparatus for queuing data, comprising:
means for providing a plurality of data queues in a transmit direction, each of said plurality of data queues having one of a predetermined plurality of different level priorities;
means for establishing a predetermined weighted round robin scheduling of servicing each of said plurality of data queues, said scheduling including an unequal number of services to at least two of said plurality of data queues in each service round;
means for checking for a data starvation condition of one of said plurality of data queues having a lowest priority, said data starvation condition is determined by identifying whether a number of data messages buffered for transmission exceeds a predetermined threshold; and
means for switching to said weighted round robin scheduling technique if said data starvation condition exists.

19. The apparatus for queuing data according to claim 18, wherein:
a first one of said plurality of data queues includes video data;
a second one of said plurality of data queues includes voice data; and
given that both said first data queue and said second data queue include data waiting for transmission, said first data queue including video data is serviced in a predetermined fashion more often than said second data queue including voice data.

20. The apparatus for queuing data according to claim 18, wherein:
a first one of said plurality of data queues includes video data;
a second one of said plurality of data queues includes voice data; and
given that both said first data queue and said second data queue include data waiting for transmission, said second data queue including voice data is serviced in a predetermined fashion more often than said first data queue including video data.

* * * * *